(12) United States Patent
Krywitsky

(10) Patent No.: US 6,672,327 B1
(45) Date of Patent: Jan. 6, 2004

(54) DRY BREAK VALVE ASSEMBLY

(75) Inventor: Lee A Krywitsky, Calgary (CA)

(73) Assignee: Hiltap Fittings, Ltd., Calgary (CA)

( * ) Notice: Subject to any disclaimer, the term of this patent is extended or adjusted under 35 U.S.C. 154(b) by 0 days.

(21) Appl. No.: 09/628,075

(22) Filed: Jul. 28, 2000

(51) Int. Cl.[7] .......................... F16K 17/36; F16L 37/36
(52) U.S. Cl. ........................ 137/68.14; 137/614.06; 251/89.5
(58) Field of Search ........................ 137/614.06, 614.11, 137/68.14, 68.15, 614.01; 285/234; 251/89.5

(56) References Cited

U.S. PATENT DOCUMENTS

| | | | | |
|---|---|---|---|---|
| 2,333,496 A | * | 11/1943 | Townhill et al. | 137/614.01 |
| 2,340,965 A | * | 2/1944 | Kiesel | 137/68.14 |
| 2,679,407 A | * | 5/1954 | Badger, Jr. | 251/89.5 |
| 3,454,024 A | * | 7/1969 | McCullough | 137/68 |
| 3,542,047 A | * | 11/1970 | Nelson | 137/68 |
| 3,664,634 A | * | 5/1972 | Guertin et al. | 137/614.06 |
| 4,271,865 A | * | 6/1981 | Galloway et al. | 251/89.5 |
| 4,510,969 A | * | 4/1985 | Rodth | 137/614.01 X |
| 4,567,924 A | * | 2/1986 | Brown | 137/802 X |
| 4,614,201 A | * | 9/1986 | King et al. | 137/68.15 |
| 4,625,746 A | * | 12/1986 | Calvin et al. | 137/68.15 |
| 4,646,773 A | * | 3/1987 | Klop et al. | 137/68.15 |
| 4,827,960 A | * | 5/1989 | Nitzberg et al. | 137/68.15 |
| 5,297,574 A | * | 3/1994 | Healy | 137/68.15 |
| 5,316,033 A | * | 5/1994 | Schumacher et al. | 137/614 |
| 5,404,909 A | * | 4/1995 | Hanson | 137/614.06 |
| 5,529,085 A | * | 6/1996 | Richards et al. | 137/68.15 |
| 5,699,822 A | * | 12/1997 | Bodhaine | 137/68.15 |
| 5,826,610 A | * | 10/1998 | Bodhaine | 137/68.15 |
| 5,934,319 A | * | 8/1999 | Schumacher | 137/614.06 |
| 6,142,194 A | * | 11/2000 | McClaran | 137/614.06 |
| 6,155,294 A | * | 12/2000 | Cornford et al. | 137/614 |

\* cited by examiner

Primary Examiner—John Rivell
(74) Attorney, Agent, or Firm—Workman Nydegger

(57) ABSTRACT

A valve assembly with an automatic check valve feature and automatic disassembly feature. The valve assembly includes an actuating mechanism which keeps the valve gates open, establishing fluid communication. The fluid checking feature operates when the valve assembly is disassembled. When the valve assembly disassembles, the check valves automatically close. The valve assembly can be disassembled manually or automatically. The automatic disassembly feature includes a collar and breakable link assembly, which keep the valve assembly in sealing engagement. Upon a predetermined force, the breakable link assembly fails, releasing the collar from the valve assembly and effecting disassembly of the valve assembly.

55 Claims, 9 Drawing Sheets

DRY BREAK VALVE ASSEMBLY

BACKGROUND OF THE INVENTION

1. The Field of the Invention

The present invention relates generally to valve assemblies for use in managing flow through fluid conduits. More particularly, the present invention relates to a dry break valve assembly that releasably joins two fluid conduits in such a way that separation of constituent portions of the dry break valve assembly automatically terminates fluid flow from each of the respective conduits, and thereby substantially prevents material leakage of the fluid.

2. The Prior State of the Art

In recent years, environmental concerns have been receiving significantly more attention, and various governmental agencies have responded by implementing stringent regulations to reduce or prevent pollution. Many of these regulations and concerns are directed towards those industries that transport fluids. For example, it is very difficult to transport a fluid without spilling or leaking some of the fluid into the environment. Thus, some environmental regulations require that minimal leaking occur during handling, processing, or transportation of the fluid.

These environmental concerns become especially clear when considering the magnitude of the industries that handle fluids that can cause significant damage in small quantities. There is a concern, therefore, to protect both the public and the environment from these types of fluids. While some fluids that are transported, such as water and milk, may not pollute the environment when they are leaked or spilled, the loss of fluid into the environment is nevertheless viewed as a general waste of resources. More generally, the loss of fluid into the environment is not desirable even if the fluid does not contribute to pollution.

Within the transportation industry, a variety of different devices are used to transport a fluid from a source to a destination. These devices often use valve assemblies and conduits of various types to both connect the source to the destination as well as to manage fluid flow through the conduit. Usually, the conduit is pressurized to direct fluid toward the desired destination. With each transfer of fluid, there is a risk that leakage will occur due to human error, equipment malfunctions, or the like. As previously stated, it is desirous and often critical to ensure that the spills or leaks are substantially minimized.

A common source of fluid leaks and fluid spills are the valves that are used to connect a fluid source to a fluid destination. Various types of valves have been designed to stop (i.e., check) the fluid flow when the valve is manually disassembled. One known device for checking fluid flow is a ball check valve. A ball check valve is essentially a ball (i.e., a check ball) which rests against a ball seat to form a valve. An operator may use the ball check valve to initiate or terminate the fluid flow. Despite the checking feature of the ball check valve, a problem exists in the integrity of the fluid transfer system when the valve or conduit undergoes stress.

When the conduit and the valve are subjected to forces such as stretching, pulling, twisting, and the like, the fluid being transferred through the conduit and the valve may leak or spill into the environment. More particularly, the conduit, rather than the ball check valve, is likely to rupture or otherwise malfunction in the presence of these forces. Thus, while the ball check valve is appropriate for checking fluid flow, it does not prevent spillage or leakage when subjected to external stress. Because the conduit is likely to rupture or otherwise malfunction in these types of situations, the spillage or leakage of fluid into the environment can be significant because the fluid flow can no longer be checked.

For example, when a fuel transport vehicle is delivering liquid through a conduit such as a hose into a fuel tank, the hose is attached to the vehicle at one end and to a fuel tank at the other end. A valve such as a ball check valve may be disposed at the vehicle end of the hose such that fluid communication through the hose may be established or checked. If the vehicle drives away with the hose connection still intact, the connection will break or rupture. Because the hose is the weakest part of the connection, the break usually occurs somewhere in the hose and fluid escapes out into the environment. In this example, the ball check valve typically does not disassemble because it is much stronger than the hose. Even if the ball check valve were to break instead of the hose, fluid would still leak from either the source of the destination of the fluid.

The previous example illustrates the need, especially with highly toxic chemicals or hazardous wastes, for a valve assembly that is designed to automatically disassemble when there is excessive force in the fluid transport system that threatens to break the conduit. In addition, the checking feature of the valve assembly should operate automatically and at substantially the same time as the automatic disassembly of the valve.

Further, with the trend toward automating fluid transfer processes, there is a need for safety mechanisms that are automated. For example, fuel transfer systems are under development wherein tankers drive into a delivery unit, automatically hook up the fuel delivery system, transfer the fuel, and exit the delivery unit with minimum human intervention. In this situation, it is critical that safety mechanisms are provided because of the lack of error detection by humans.

In view of the foregoing problems, it would be an advancement in the art to provide for a device that resolves at least the aforementioned problems. In particular, the device should automatically disassemble upon application of a predetermined force and should automatically check fluid flow of the conduit such that leakage is substantially prevented from both the source and the destination of the fluid.

SUMMARY OF THE INVENTION

The present invention has been developed in response to the current state of the art, and in particular, in response to these and other problems and needs that have not been fully or adequately solved by currently available fluid system components. Thus, it is an overall feature of embodiments of the present invention to provide a dry break valve assembly that resolves at least the aforementioned problems. It is a further feature of the present invention to provide a dry break valve assembly that will automatically terminate or check flow from two conduits joined by the dry break valve assembly, upon separation of constituent parts of the dry break valve assembly. It is yet another feature of the present invention to facilitate the flow of fluid through a valve assembly.

In one embodiment, the dry break valve assembly provides two essential safety features to prevent substantial leakage during transfer of fluids. An automatic separation feature is provided which automatically disassembles the valve assembly upon application of a predetermined force.

For example, such a force may occur when a truck drives away from a tank before uncoupling the dry break valve which facilitated the transfer of fluid from the truck to the tank. The separation or disassembly feature causes the valve to disassemble while minimizing spillage or leakage of the fluid. The spillage or leakage is minimized by an automatic checking feature that stops fluid flow when the valve assembly is disassembled in this manner. The checking feature may also be used when the dry break valve is used in normal operations.

The valve assembly includes a cam mechanism which keeps the valve gates within the valve open, establishing fluid communication. Essentially, when the valve assembly is fully opened, the cam mechanism automatically locks into place as a result of the equilibrium of torque forces and spring forces. The lock is released when the valve assembly is disassembled and the valve gates close automatically, thus providing an automatic check valve feature.

The valve can be disassembled manually or automatically. The valve assembly has a first housing and a second housing which are maintained in sealing engagement by a sleeve. The sleeve can be further divided into two portions, which are kept in sealing engagement with a collar and a breakable link assembly. The automatic separation or disassembly feature is permitted in one embodiment by the collar and breakable link assembly. The breakable link assembly is configured to support a predetermined amount of stress. When the valve assembly is subjected to forces beyond that predetermined stress point, the shear pin fails, releasing the collar from engagement with the sleeve. The separation of the collar releases the valve assembly from sealing engagement and initiates the automatic check valve feature.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. It will be appreciated that the drawings are not necessarily drawn to scale and that these drawings depict only typical embodiments of the invention and are not to be considered to be limiting of the scope of the invention.

DETAILED DESCRIPTION OF THE INVENTION

The present invention provides several advantages while allowing a fluid to flow from the fluid source to the fluid destination. The dry valve assembly has a break or disassemble feature that minimizes leaks or spills of the fluid. The dry valve assembly has two primary components that separate when a certain force is applied to the valve. When the valve disassembles into two separate pieces, each separate piece is configured to automatically close such that the fluid is not permitted to leak out of the separate valve components. This ability to close and check the fluid flow when the valve is inadvertently disassembled is also utilized when the dry valve is purposely disassembled or uncoupled. Alternatively, the fluid flow can be stopped or checked while the valve components are still connected. Another advantage of the valve described herein is that the structure of the valve also permits high flow rates for the fluid when the components of the valve that control fluid flow are open.

Reference will now be made to figures wherein like structures will be provided with like reference designations. It is to be understood that the drawings are diagrammatic and schematic representations of various embodiments of the invention, and are not to be construed as limiting the present invention, nor are the drawings necessarily drawn to scale.

Figure 1:
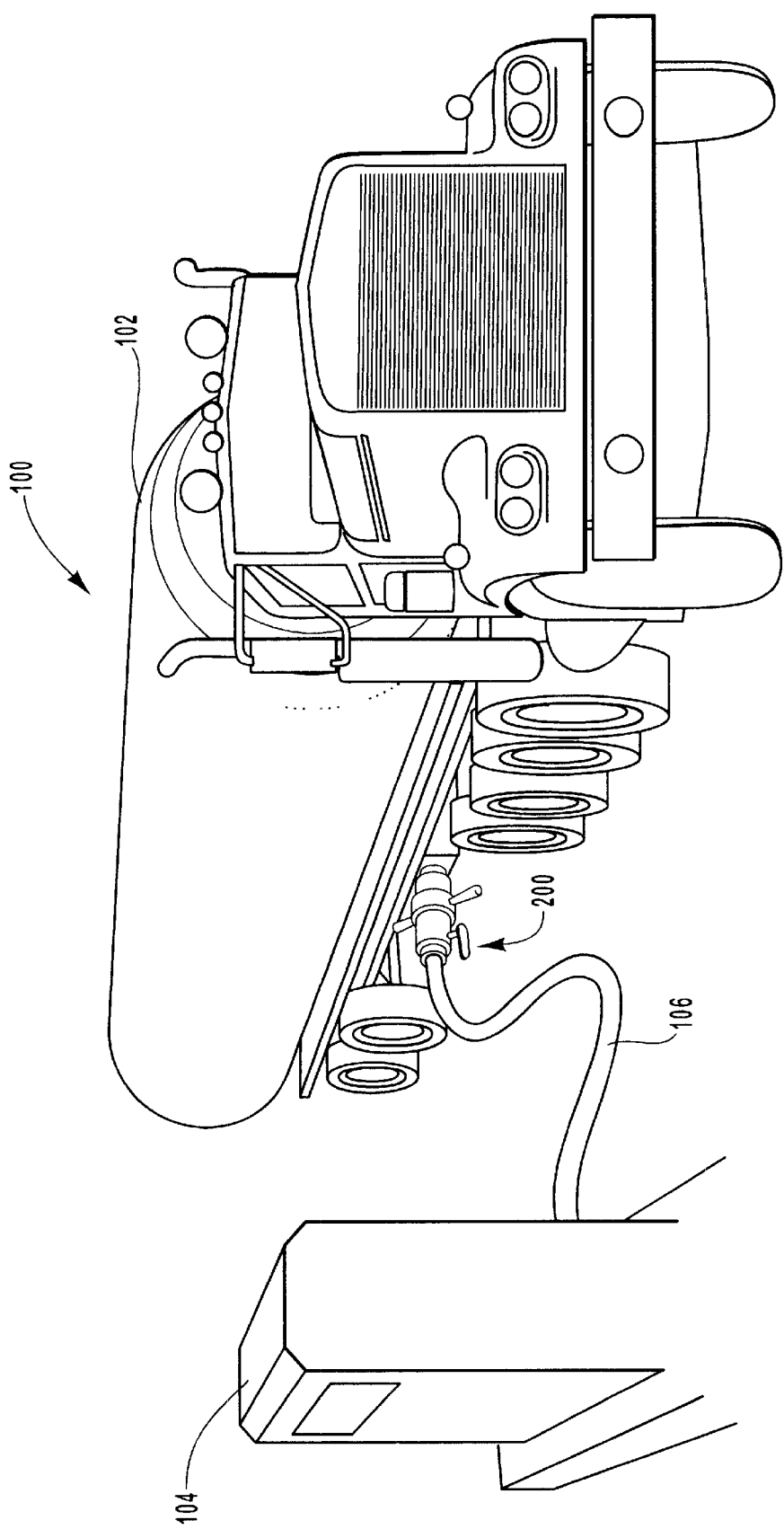
FIG. 1 depicts an exemplary operating environment for the present invention.

With reference first to FIG. 1, one embodiment of a fluid transfer system is indicated generally at 100. Note that, as contemplated herein, "fluid" includes liquids, gases, or combinations thereof. In the embodiment depicted in FIG. 1, fluid transfer system 100 includes a fluid source 102 configured for fluid communication with a dry break valve assembly 200. Dry break valve assembly 200, in turn, is configured for selective fluid communication with a fluid destination 104, by way of a fluid conduit 106.

As discussed elsewhere herein, it will be appreciated that dry break valve assembly 200 may be located, in its entirety, at fluid source 102, or alternatively at fluid destination 104. In one embodiment, discussed in detail below, dry break valve assembly 200 comprises at least two discrete portions, one of which may be located at fluid source 102, and the other of which may be located at fluid conduit 106, or vice versa in a fluid loading situation.

As contemplated herein, the term "conduit" is meant to include any structure or device adapted to facilitate transportation of a fluid, wherein such structures and devices include, but are not limited to, pipes, hoses, tubes, or the like. Fluid conduit 106 may be constructed of a variety of materials, or combinations thereof, including, but not limited to, metal, plastic, rubber, and the like.

With continuing reference to FIG. 1, the fluid source 102 is illustrated as a fluid transport vehicle, and the fluid destination 104 is illustrated as an underground tank. However it will be appreciated that fluid source 102 and/or fluid destination 104, may comprise any of a variety of different static or mobile structures and vehicles. Such structures and vehicles include, but are not limited to, air, water, or land vehicles, such as, but not limited to, trucks, boats, automobiles, motorcycles, ships, railcars, aircraft, and the like, as well as structures such as tanks, reservoirs, and the like.

In operation, a pressure differential is imposed between fluid source 102 and fluid destination 104 so as to cause flow of the fluid through fluid conduit 106 in the desired direction. It will be appreciated that the pressure differential may be imposed in such a way as to cause flow to proceed in the opposite direction as well. The pressure differential may result from the force of gravity, or may alternatively be imposed by various types of equipment and devices including, but not limited to, pumps and the like.

In general, valve assembly 200 facilitates management and control of fluid flow between fluid source 102 and fluid destination 104. In particular, valve assembly 200 allows for selective establishment and termination of fluid communication between fluid source 102 and fluid destination 104. Additionally, valve assembly 200 facilitates releasable engagement of two different fluid system components, for example, fluid conduit 106 and fluid source 102. Finally, valve assembly 200 includes various features which substantially prevent fluid leakage should the discrete portions of dry break valve assembly 200 be separated for any reason.

Figure 2:
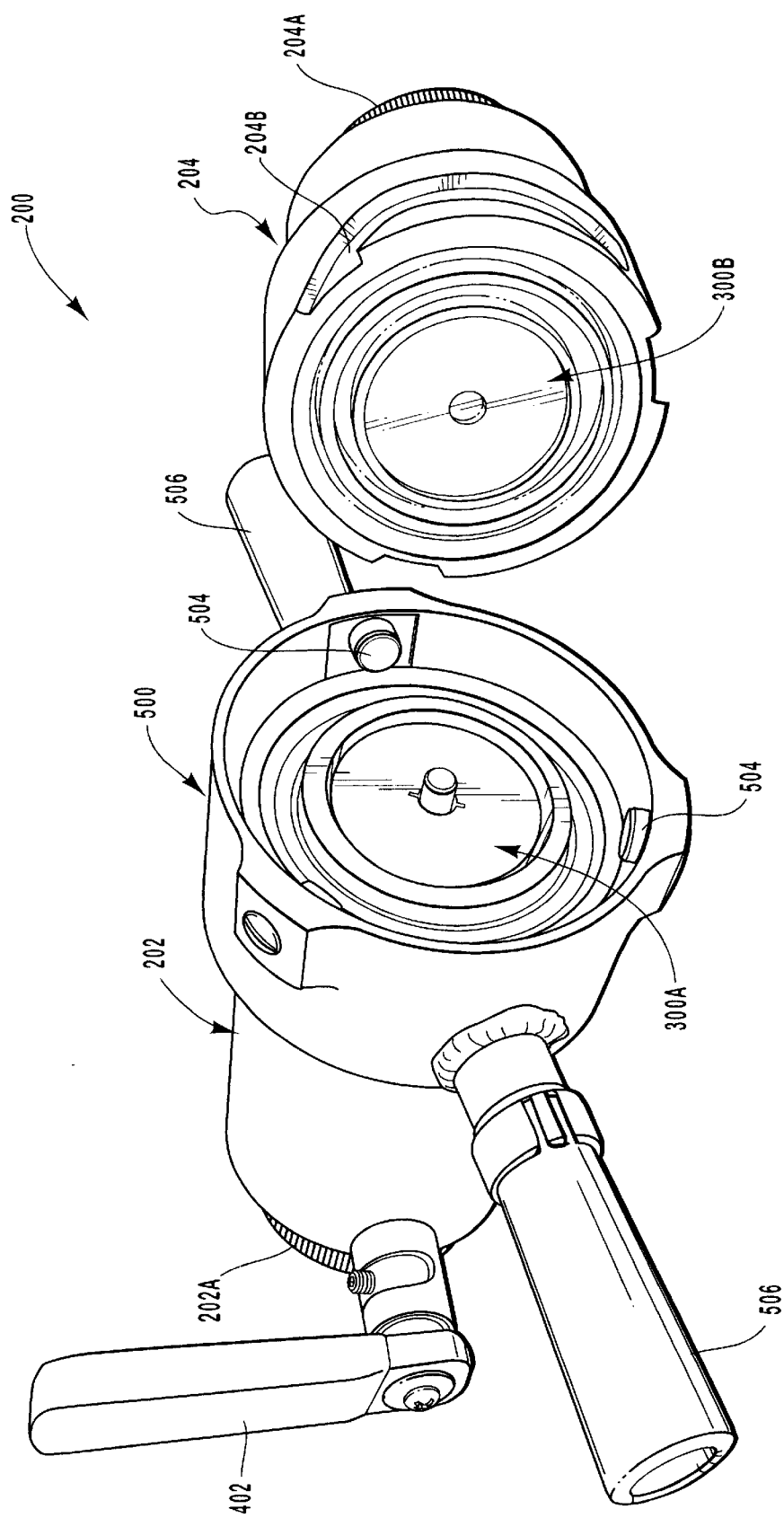
FIG. 2 is a perspective view of an embodiment of the dry break valve assembly where a source housing and a destination housing may be releasably connected using a sleeve.

With reference now to FIG. 2, valve assembly 200 includes a first housing portion 202 and second housing portion 204. As used herein, the portion of the valve assembly closest to the fluid source is referred to as the source housing while the other housing portion is referred to as the destination portion. Either portion of the valve assembly can be the source housing or the destination housing. Coupling 500 serves to removably secure first housing portion 202 and second housing portion 204 in a substantially leakproof engagement.

Substantially disposed within first housing portion 202 and second housing portion 204, respectively, are flow control assemblies 300A and 300B. In general, flow control assemblies 300A and 300B facilitate management of fluid flow through conduits, or the like, connected to first housing portion 202 and second housing portion 204, respectively. Also disposed within first housing portion 202, and discussed in greater detail below, is an actuating mechanism (not shown in FIG. 2), which serves to manipulate the position of flow control assemblies 300A and 300B in response to input provided by way of actuating lever 402. Thus, the position of the flow control assemblies 300A and 300B may vary between fully open and fully closed.

First housing portion 202 includes a conduit connector 202A. Conduit connector 202A is configured to attach to fluid conduit 106 (shown in FIG. 1), wherein such attachment may be accomplished in a variety of ways including, but not limited to, welding, brazing, soldering, and the like. Alternatively, conduit connector 202A may comprise a compression fitting, threaded fitting, or the like for attaching to fluid conduit 106.

In similar fashion, second housing portion 204 has a conduit connector 204A. Conduit connector 204A is configured to attach to fluid conduit 106, wherein such attachment may be accomplished in a variety of ways including, but not limited to, welding, brazing, soldering, and the like. Alternatively, conduit connector 204A may comprise a compression fitting, threaded fitting, or the like for attaching to fluid conduit 106. It will be appreciated that conduit connector 202A and/or conduit connector 204A may, alternatively, be connected directly to fluid source 102 or fluid destination 106.

Figure 3:
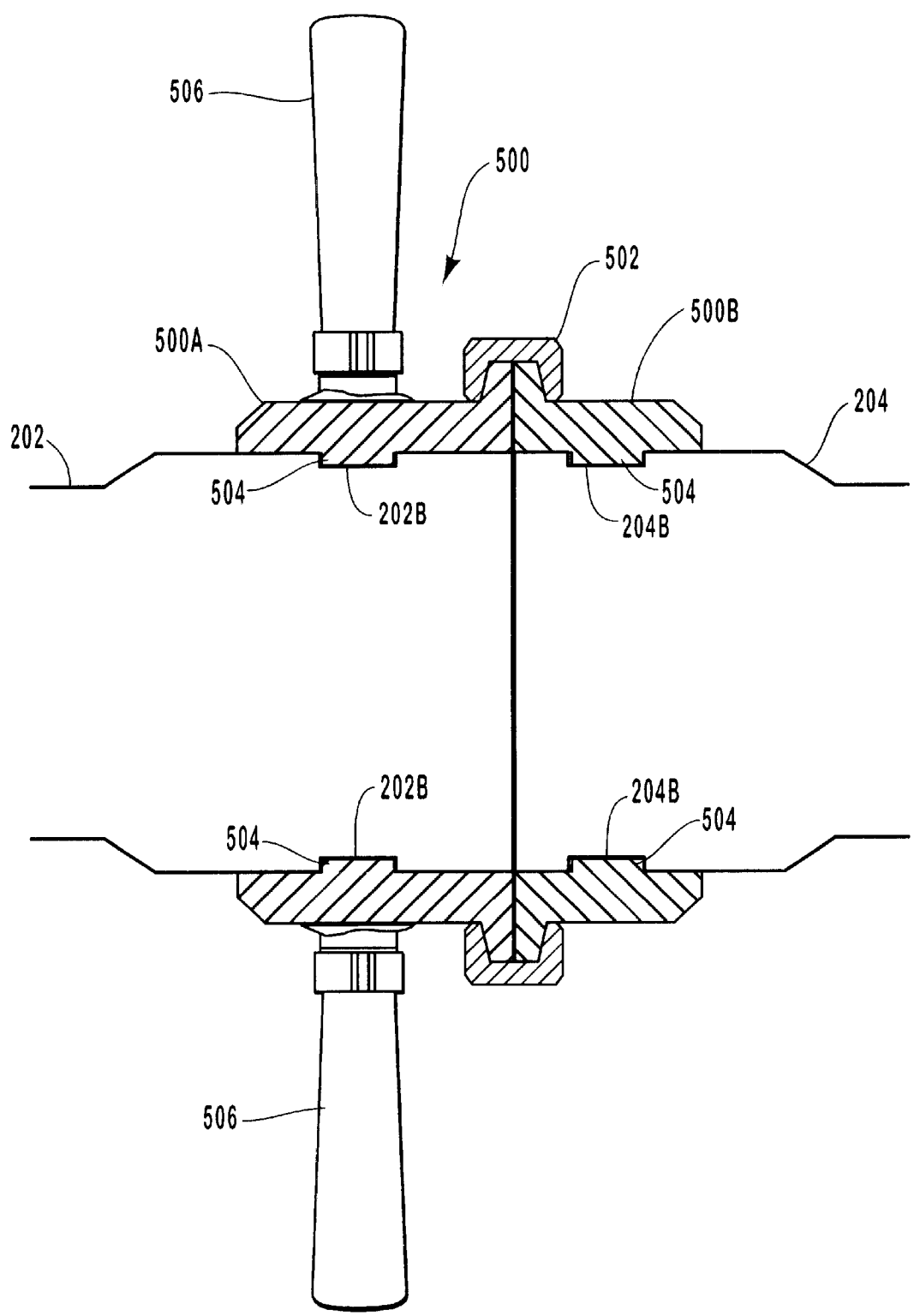
FIG. 3 depicts one embodiment of a sleeve which releasably seals and connects a source housing with a destination housing.

Directing attention now to FIG. 3, and with continuing attention to FIG. 2, additional details regarding coupling 500 are provided. As indicated in FIG. 3, coupling 500 includes a first engaging portion 500A and a second engaging portion 500B joined together by collar 502 which serves to substantially prevent relative motion between first engaging portion 500A and a second engaging portion 500B. Preferably, first engaging portion 500A and a second engaging portion 500B each comprise an outward extending annular ridge or the like which, when brought into a confronting relation with each other, are collectively configured to mate with corresponding structure defined by collar 502, as suggested in FIG. 3. It will be appreciated however, that coupling 500 and collar 502, either individually or collectively, may be configured in any number of alternate ways that would facilitate achievement of the functionality disclosed herein. In addition the connecting portions of the engaging portions 500A and 500B may be ridged to ensure that relative motion between the portions does not occur.

In one embodiment, first engaging portion 500A and a second engaging portion 500B each further includes a plurality of pins 504 that mate with corresponding grooves 202B and 204B, defined by first housing portion 202 and second housing portion 204, respectively. Thus, a rotary motion imparted to coupling 500 by way of handles 506 releasably joins first engaging portion 500A and a second engaging portion 500B to first housing portion 202 and second housing portion 204, respectively, by causing pins 504 to travel to the respective ends of grooves 202B and 204B. Preferably, grooves 202B and 204B are of such a length that a rotary motion of about 90 degrees is adequate to releasably couple first housing portion 202 to second housing portion 204. It will be appreciated that a rotary motion of about 120 degrees in the opposite direction will be effective to disengage coupling 500 and thus release first housing portion 202 from second housing portion 204.

It will be appreciated that the arrangement of coupling 500 with respect to first housing portion 202 and second housing portion 204 may be varied in a number of ways. For example, in one embodiment, first engaging portion 500A is integral with first housing portion 202, so that only second engaging portion 500B comprises pins 504. Correspondingly, only grooves 204B are present and grooves 202B are not required. In this embodiment, a rotation, preferably about 120 degrees, imparted to coupling 500 by way of handles 506 causes rotating pins 504, or bearings in another embodiment, to travel the length of grooves 204B so that coupling 500 thereby releasably joins first housing portion 202 to second housing portion 204.

Yet another embodiment employs essentially a reverse configuration of that just discussed. In particular, in this embodiment, second engaging portion 500B is integral with second housing portion 204, and only first engaging portion 500A includes pins 504. Correspondingly, only grooves 202B are present and grooves 204B are not required. In this embodiment, a rotation, preferably about 90 degrees, imparted to coupling 500 by way of handles 506 causes pins 504 to travel the length of grooves 202B so that coupling 500 thereby releasably joins first housing portion 202 to second housing portion 204.

Finally, it will be appreciated that other types of structure and devices may be usefully employed to achieve the functionality collectively provided by pins 504 and grooves 202B and 204B. Accordingly, other structures and devices that provide such functionality are contemplated as being within the scope of the present invention, wherein such other structures and devices include, but are not limited to, threaded connections, spring-biased connections, and the like.

Figure 4:
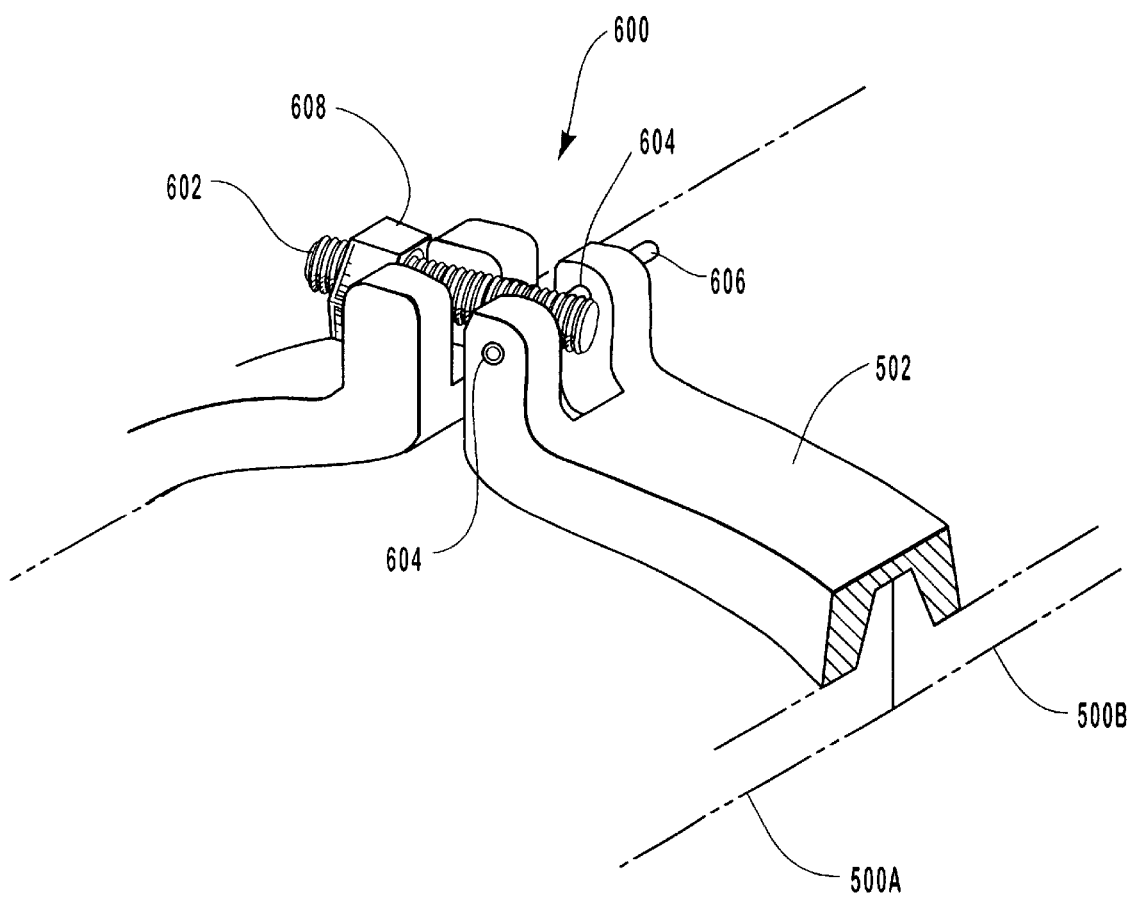
FIG. 4 is a perspective view indicating various details of a breakable link assembly that is an integral portion of a collar.

Directing attention now to FIG. 4, and with continuing attention to FIG. 3, additional details regarding collar 502 of coupling 500 are provided. In particular, collar 502 further includes a breakable link assembly 600. Generally, breakable link assembly 600 serves two primary purposes. First, breakable link assembly 600 serves to retain collar 502 securely in place about first engaging portion 500A and second engaging portion 500B of collar 502. Further, breakable link assembly 600 includes a sacrificial element that is designed to break, thereby allowing first engaging portion 500A and second engaging portion 500B to separate from each other, when a force, or forces, of predetermined magnitude are applied to particular elements of fluid transfer system 100, such as to valve assembly 200, or to fluid conduit 106.

In effect, when the sacrificial element breaks, then the coupling 500 is no longer capable of joining the first and second housings of the valve assembly and the valve assembly disassembles into two separate components. As previously described, fluid flow from each separate housing may be checked and when the valve assembly separates in this manner, fluid flow is checked and fluid spillage or leakage is thereby minimized.

As suggested in FIG. 4, collar 502 is essentially C-shaped, having an opening between its two ends. Breakable link assembly 600 is disposed across the opening thus defined and includes a threaded member 602, such as a bolt or the like, defining a bore (not shown) near one end. Preferably, the bore thus defined is substantially perpendicular to the longitudinal axis of threaded member 602. A shear pin 604 is slidably disposed in the bore and the opposing ends of shear pin 604 are received in collar 502 as indicated. Preferably, shear pin 604 is prevented from exiting the bore by way of cotter pins 606, or the like, disposed at either end of shear pin 604. It will be appreciated that shear pin 604 may alternatively be glued, welded, brazed, or otherwise bonded to collar 502 so as to prevent it from exiting the bore in threaded member 602.

Breakable link assembly 600 further includes a nut 608, or the like, engaged for advancement along threaded member 602. In operation, nut 608 is rotated so as to advance along threaded member 602 and thus draw the opposing ends of collar 502 securely together.

The operation of breakable link assembly 600 proceeds generally as follows. In the event a force, or forces, of predetermined magnitude in either a tensile or axial load are applied to valve assembly 200 and/or to fluid conduit 106, shear pin 604 will fracture and the valve assembly will disassemble. It will be appreciated that the materials and/or geometry of shear pin 604 may desirably be varied to adjust the point at which fracture will occur. It will further be appreciated that sacrificial elements other than shear pin 604 may usefully be employed. In general, any sacrificial element and/or breakable link assembly that provides the functionality, disclosed herein, of shear pin 604 and/or breakable link assembly 600 is contemplated as being within the scope of the present invention.

Upon fracture of shear pin 604, threaded member separates from collar 502, thus permitting the ends of collar 502 to move apart and thereby allow separation of first housing portion 202 and second housing portion 204. The functionality provided by breakable link assembly 600 thus ensures that in the event a predetermined level of force is applied to dry break valve assembly 200, or to components to which it is connected, dry break valve assembly 200 will break dry, and thus substantially prevent any material leakage of fluid.

Further, breakable link assembly 600 substantially ensures that in the event such forces are applied, no material damage occurs to the components of fluid transfer system 100 (see FIG. 1). Thus, in addition to minimizing the fluid loss that would otherwise occur, the conduit 106 is preserved and damage is not done to the fluid source or the fluid destination.

Note that a variety of means may be profitably employed to perform the functions enumerated herein, of sealingly engaging first housing 204 with second housing 206 using coupler 500. Coupler 500 is an example of means for sealingly engaging first housing portion 202 and second housing portion 204. Accordingly, the structure disclosed herein simply represents one embodiment of structure capable of performing this function. It should be understood that this structure is presented solely by way of example and should not be construed as limiting the scope of the present invention in any way.

The valve assembly 200 and its various parts may be made of a range of materials depending on the type of fluid being transferred. Preferably, a material is chosen that can withstand corrosion and high temperature thermal cycling, such as carbon steel or stainless steel. Generally, valve assembly 200 may be constructed from Austenitic steel.

Figure 5:
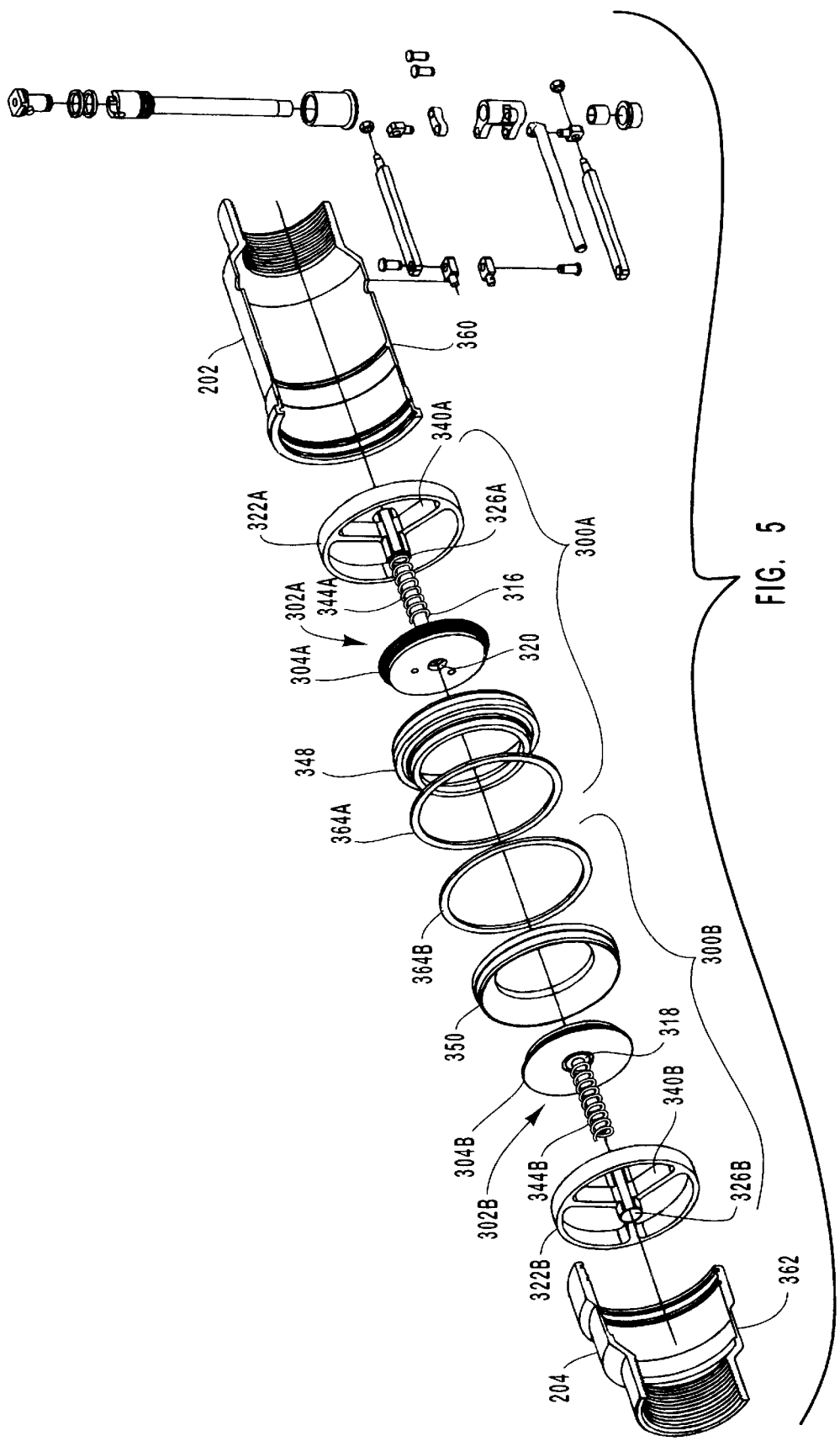
FIG. 5 is a perspective cutaway view of an embodiment of the present invention, illustrating various features of an actuating mechanism.

FIG. 5 shows an exploded perspective view of various features of the flow control assemblies of valve assembly 200. The following description of the housing configuration and flow control assemblies is by illustration only and not by way of limitation. Generally, flow control assembly 300A may comprise a flow control member 302A, a guide 322A, a resilient member 344A, a fitting member 348, and a snap ring 364A. Similarly, flow control assembly 300B may comprise a flow control member 302B, a guide 322B, a resilient member 344B, a sealing member 350, and a snap ring 364B.

Flow control assemblies 300A and 300B have a flow control member 302A and 302B, respectively. As shown in FIG. 3, flow control members 302A and 302B have a round disc-like valve gate 304A and 304B, respectively. Valve gate 304A contains a bore 320 substantially in the center of the valve gate so as to allow a substantially cylindrical piece to pass through the bore. It will be understood that bore 320 may be any geometrical shape (e.g., square, rectangular, polygonal, etc.) that will allow passage of a corresponding geometrical-shaped piece to pass through the bore.

Attached to valve gate 304A is a hollow driver shaft 316. Driver shaft 316 is placed in transverse relation to valve gate 304B. Preferably, driver shaft 316 is substantially concentric with bore 320 and contains substantially the same geometric shape as bore 320. Attached to valve gate 304B is a member 318, which may be solid or hollow. Driver shaft 316 and member 318 may be attached to valve gate 304A and 304B by any means known in the art, such as, but not limited to, welding, adhesive bonding, or may be formed integrally with valve gates 304A and 304B.

FIG. 5 further illustrates guides 322A and 322B. Guides 322A and 322B essentially add structural support to flow control assemblies 300A and 300B. Guides 322A and 322B contain bores 326A and 326B whose inner diameters correspond respectively with the outer diameters of driver shaft 316 and member 318. In practice, driver shaft 316 slidably passes through bore 326A, and, similarly, member 318 slidably passes through bore 326B. Preferably, guides 322A and 322B are essentially hollow except for three support bars generally designated as 340A and 340B. The hollow structure allows for structural members to pass through guides 322A and 322B and to be movably connected to valve gates 304A and 304B, which will be discussed in further detail later in this specification. However, it will be appreciated that guides 322A and 322B may be constructed having a partially solid configuration as long as the requisite area is present to allow for movement of parts.

FIG. 5 shows resilient member 344A and 344B which are placed onto driver shaft 316 and solid member 318, respectively. Resilient members 344A and 344B are shown in FIG. 5 to be springs. However, one skilled in the art will understand that resilient members 344A and 344B may be any structure which maintains a bias such as, but not limited to, a rubber material, an elastic material, polished metal, and the like.

FIG. 5 further depicts fitting member 348 and corresponding sealing member 350. The configuration of fitting member 348 and sealing member 350 will be discussed in more detail later in this specification. However, in general terms, fitting member 348 is tapered on one side to provide a valve seat for valve gate 302A. Similarly, sealing member 350 is tapered on one side to provide a valve seat for valve gate 302B. Preferably, valve gates 302A and 302B have corresponding tapers to allow for better sealing engagement.

As shown in FIG. 2, first housing portion 202 and second housing portion 204 are configured to allow for placement of flow control assemblies 300A and 300B to be disposed substantially within each housing. FIG. 5 shows ridge 360 placed on the interior surface of first housing portion 202. Ridge 360 acts as structural support for flow control assembly 300A. During assembly, guide 322A rests on ridge 360. Resilient member 344A is slid onto driver shaft 316, after which flow control member 302A is placed into first housing portion 202 with driver shaft 316 passing through bore 326A. Finally, fitting member 348 is placed into first housing portion 202 to complete the flow control assembly 300A. It will be understood from the drawings and foregoing discussion that flow control assembly 300B may be assembled in a manner similar to that for flow control assembly 300A.

It will be noted from FIG. 5, that second housing portion 204 has a ledge 362 to provide a similar structural function as ridge 360. It will be appreciated that first housing portion 202 and second housing portion 204 may have structural ridges and grooves on the interior surface of the housing to provide for better structural engagement of corresponding parts of flow control assemblies 300A and 300B.

In a preferred embodiment, snap rings 364A and 364B are provided for a better sealing engagement when flow control assembly 300A and 300B are assembled and for easier disassembly during maintenance of the valve assembly. In another preferred embodiment, valve gate 304A and 304B may have an O-ring placed along the taper to provide for better sealing engagement.

Figure 6:
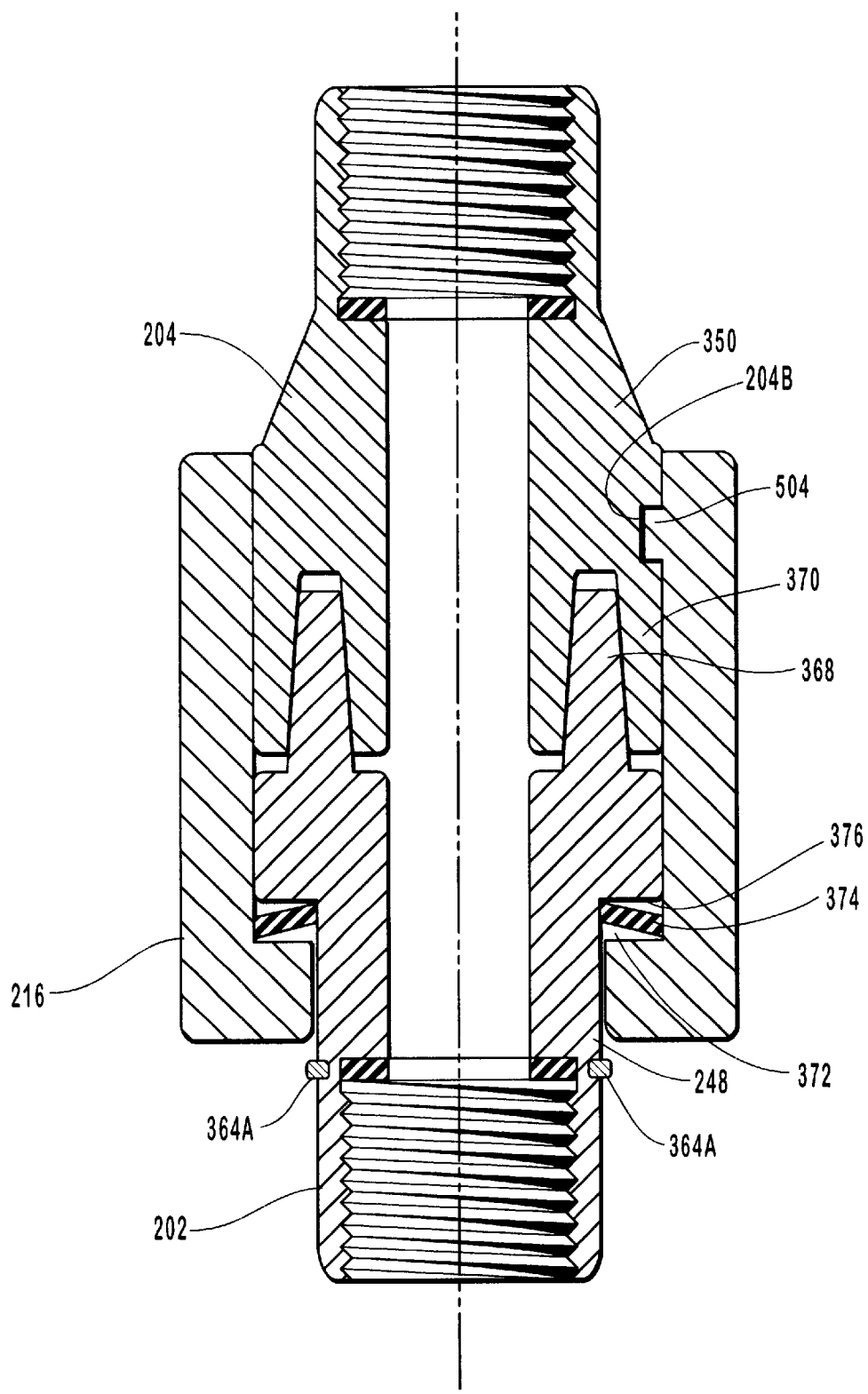
FIG. 6 is a cross sectional view of a sealing interface within the dry valve assembly.

FIG. 6 is a cross-section of a preferred embodiment of the dry break valve assembly, illustrating the sealing engagement between first housing portion 202 and second housing portion 204. First housing portion 202 and second housing portion 204 are joined in sealing engagement preferably in at least two ways at their outer rims and between fitting member 348 and sealing member 350.

FIG. 6 shows the outer rims of first housing portion 202 and second housing portion 204 in sealing engagement. During assembly of dry break valve assembly 200, coupler 500 acts to join the outer rims of first housing portion 202 and second housing portion 204 to join them in sealing engagement. Tightening of the coupler 500 further acts to seal valve assembly 200. Preferably, L-shaped grooves 204B are configured such that sealing engagement occurs when pins 504 are engaged with L-shaped grooves 204B.

Preferably, a sealing feature is also provided between fitting member 348 and sealing member 350. As shown in FIG. 6, fitting member 348 is provided with a tapered ridge 368 running parametrically around fitting member 348. Similarly, sealing member 350 is provided with a corresponding tapered channel 370 running parametrically around sealing member 350. The terms "peripheral" and "parametric" are adopted herewith to describe tapered ridge 368 and tapered channel 370 since tapered ridge 368 is disposed around the perimeter of an interior cavity formed within fitting member 348. Thus, peripheral tapered ridge 368 peripherally defines the opening of a cavity formed through fitting member 350. By providing ridge 368 and channel 370 with tapered surfaces, greater surface area is provided which allows an improved sealing engagement without increasing the diameter of the embodiment as is required, for example, to increase the sealing surface area when using a common flange joint.

Coupler 500 is provided with compressing edge 372 which biases compensating washer(s) 374 against abutting edge 376 of fitting member 348. Coupler 500 attaches to the external surface of sealing member 350 by the twist coupling method discussed previously and described in more detail hereinafter. Compensating washer(s) 374, shown best in FIG. 6, serves a dual purpose. Compensating washer(s) 374 provides compensation due to "creeping" (degradation of the seal due to thermal contraction) which occurs at low temperatures. Compensating washer(s) 374 also serves to bias coupler 500 in a direction which will hold pins 504 in the L-shaped grooves 204B and thus provides the tension necessary for proper operation of the twist coupling. In this regard, when pins 504 are seated in the L-shaped grooves 204B, compensating washer(s) 374 biases fitting member 348 towards sealing member 350, and thus assists in forming a proper seal.

As can be seen best in FIG. 6, fitting member 348 is provided with an abutting edge 376 while coupler 500 is provided with a compressing edge 372. One pin 504 and L-shaped groove 204B can be seen in the lower portion of FIG. 6. Compensating washer(s) 374 is positioned so that compressing edge 372 and abutting edge 376 are urged apart. Pins 504, grooves 204B, and compensating washer(s) 374, are arranged such that sealing contact between tapered ridge 368 and tapered channel 370 occurs when pins 504 are situated in grooves 204B. This arrangement provides that when pins 504 are received in the grooves 204B, compensating washer(s) 374 is partially or fully compressed.

It should be understood that compensating washer(s) 374 may be replaced by structures other than that shown and described in connection with FIG. 6 above. For example, if the embodiment is to be used only under moderate temperature and pressure conditions, compensating washer(s) 374 may be a washer of a resilient or elastic material, such as rubber. Depending upon the application, those skilled in the art will be able to determine what alternative structures and materials may be used for compensating washer(s) 374. The washer(s) 374 is preferably compressible so as to allow pins 504 to seat in grooves 204B while urging tapered ridge 368 into sealing engagement with tapered channel 370. This arrangement provides a coupling which is highly resistant to loosening due to vibration.

By the above-described arrangement, tapered ridge 368 is held in tight sealing arrangement with tapered channel 370.

Note that a variety of means may be profitably employed to perform the functions enumerated herein, of providing a sealing engagement between first housing portion 202 and second housing portion 204. Fitting member 348 and sealing member 350 are examples of means for sealingly engaging first housing portion 202 and second housing portion 204. Accordingly, the structure disclosed herein simply represents one embodiment of structure capable of performing these functions. It should be understood that this structure is presented solely by way of example and should not be construed as limiting the scope of the present invention in any way.

Figure 7:
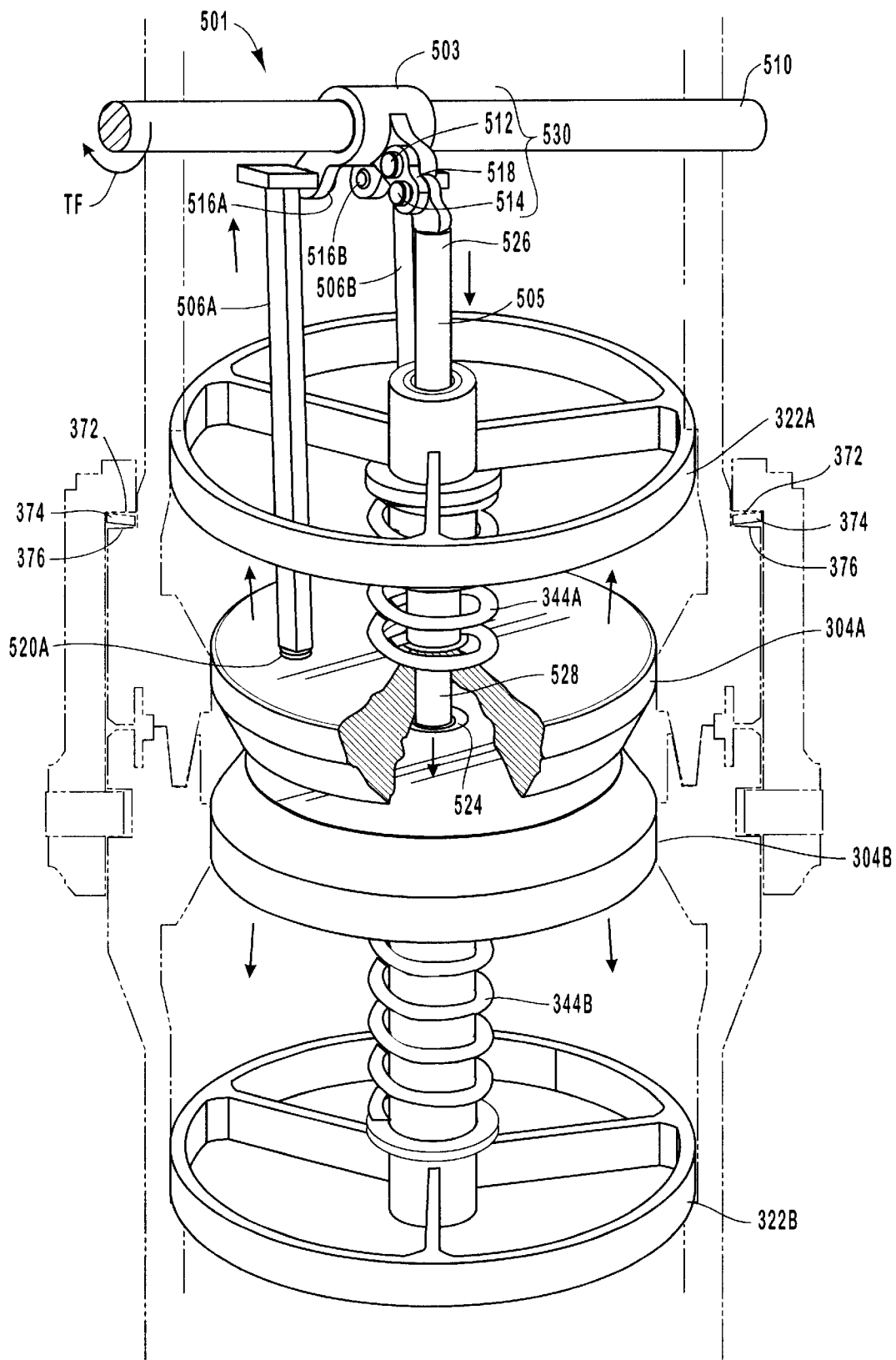
FIG. 7 is a perspective view illustrating an actuating mechanism disposed within the valve assembly.

In a preferred embodiment, an actuating mechanism is used to operate the flow control assemblies 300A and 300B. FIG. 7 illustrates a perspective view of a preferred actuating mechanism 501. Preferably, actuating mechanism 501 uses cam action in operation. Cam action refers generally to a sliding piece in a mechanical linkage used especially in transforming rotary motion into linear motion or vice versa.

As depicted in FIG. 7, actuating mechanism 501 has a cam handle 503. Cam handle 503 provides three attachment sites, 512, 516A, and 516B. Attached to site 512 is cam arm 518, which in turn is connected to driver 505 at attachment site 514. Driver 505 has a first end 526 and a second end 528. Driver 505 is shown in FIG. 7 to be essentially cylindrical in shape. However, it will be understood that driver 505 may be any geometric shape which will correspond with driver shaft 316 and guide bore 326A. Driver 505 is essentially a mechanical piece for imparting motion to components of the dry valve assembly as will be discussed in further detail later in the specification. Attached to sites 516A and 516B are displacement shafts 506A and 506B. Displacement shafts 506A and 506B are shown in FIG. 7 to be essentially rectangular in shape. However, it will be understood that displacement shafts 506A and 506B may be manufactured in any geometric shape, such as cylindrical, elliptical, square, and the like, without departing from the scope of the present invention.

Preferably the connections of driver 505 and displacement shafts 506A and 506B to cam handle 503 at sites 512, 516A and 516B are pin connections such that the parts may be movably connected. However, it will be understood that such connections may be done in a variety of ways known to the art including, but not limited to a bolt, a screw, pins, and the like.

As shown in FIG. 2, cam handle 402, also referred to as an actuating lever, is connected to an actuating arm 510, which, in turn, is connected to an actuating lever 508. Actuating arm 510 is substantially disposed within first housing portion 202. Actuating arm 510 is preferably placed such that it is substantially over the center of actuating mechanism 501. Preferably actuating arm 510 and cam handle 503 are connected such that cam handle 503 cannot move independently of actuating arm 510.

FIG. 7 also shows valve gates 304A and 304B in relation to actuating mechanism 501. Valve gate 304A is shown operably connected to actuating mechanism 501 while valve gate 304B is disposed in operative relation to the actuating mechanism. Actuating mechanism 501 effects motion in both valve gate 304A and 304B at substantially the same time.

Valve gate 304A is shown with second end 528 of driver 505 disposed through bore 320. Preferably, in the resting position, second end 528 is substantially disposed within bore 320. However, it will be understood that second end 528 may be partly out of bore 320 without departing from the scope of the present invention. The driver 505 is sized to slidably pass through bore 320 without substantial obstruction from bore 320.

Displacement shafts 506A and 506B are shown to be connected to valve gate 304A at attachment sites 520A and 520B. Bore 320 and sites 520A and 520B are placed in a triangular configuration with sites 520A and 520B being placed substantially equidistant from bore 320. Sites 520A and 520B are also placed substantially equidistant from actuating arm 510 such that displacement shafts 506A and 506B are in substantial alignment with one another. Preferably the connections between displacement shafts 506A and 506B and connection sites 520A and 520B are pin connections such that the parts may be movably connected. However, it will be understood that the parts may be connected by known means in the art, such as, but not limited to, welding, bolting, and the like, without exceeding from scope of the present invention.

Figure 7A:
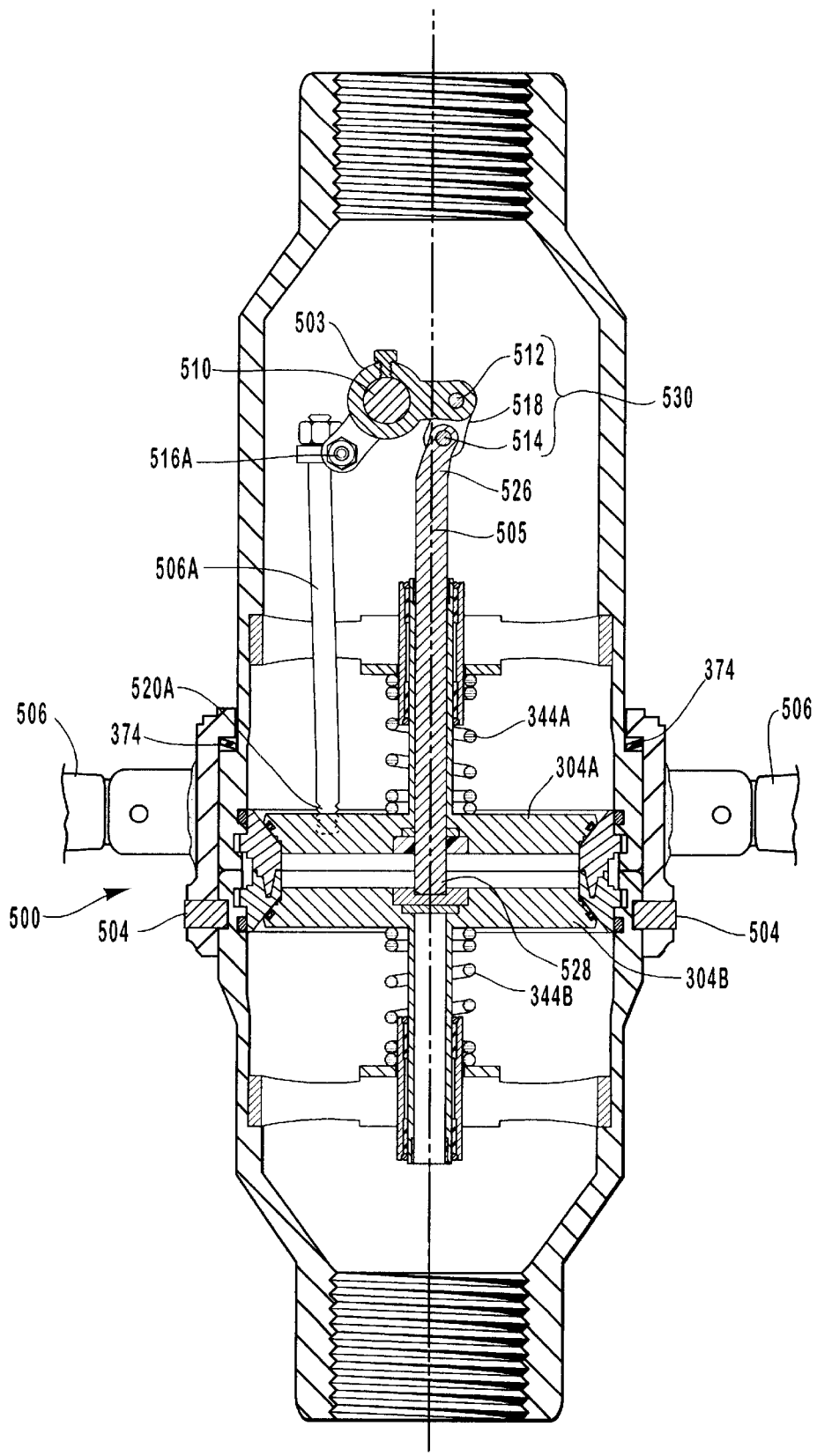
FIG. 7A is a side view of the actuating mechanism, illustrating the actuating mechanism in a position that allows fluid transfer according to one embodiment of the present invention.
Figure 7B:
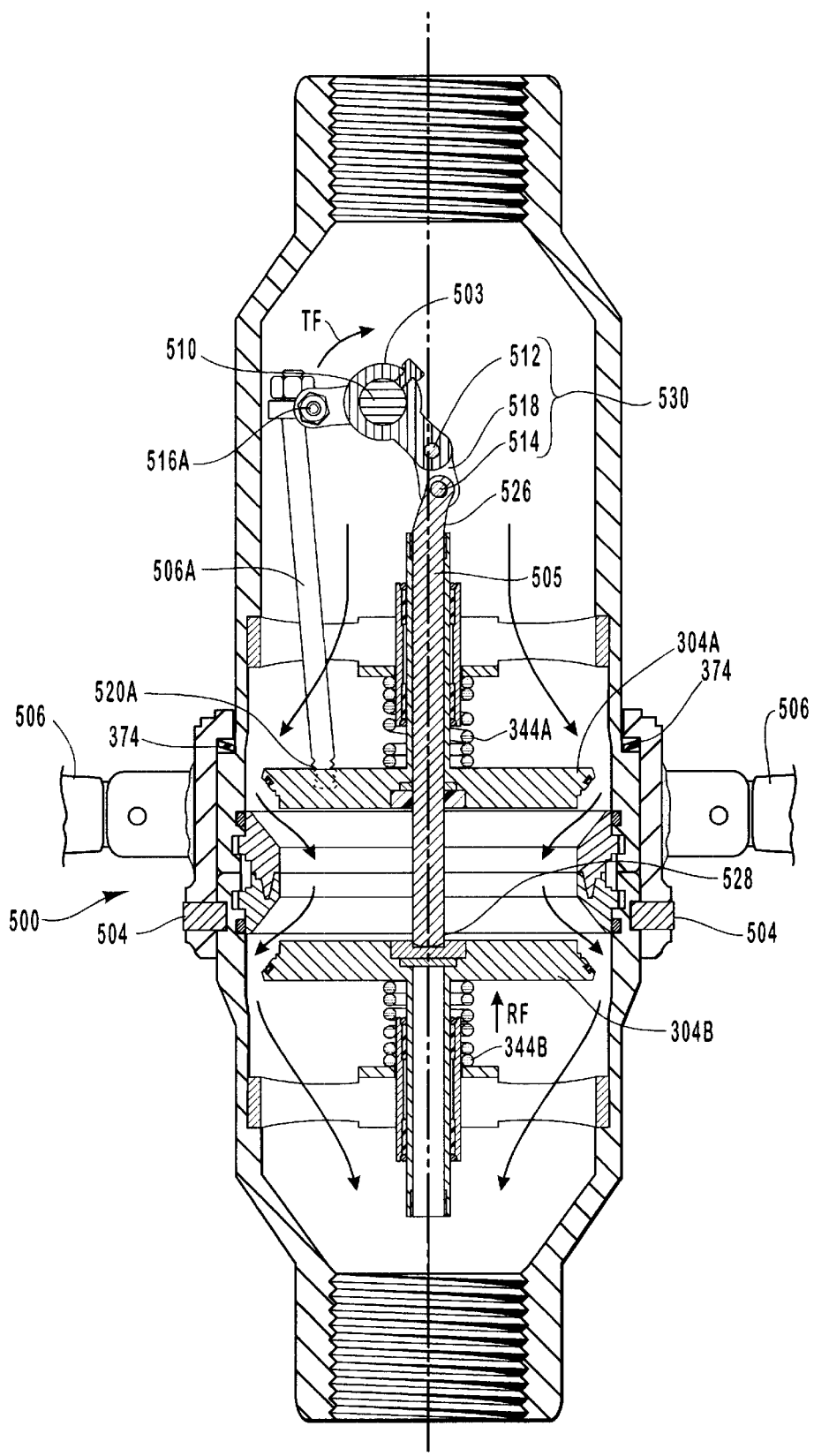
FIG. 7B illustrates a side view of the actuating mechanism, illustrating the actuating mechanism in a position that prevents fluid transfer through the dry valve in accordance with one embodiment of the present invention.

Referring now to FIGS. 7A and 7B, the operation of actuating mechanism 501 will be discussed in detail. FIG. 7A shows a side view of actuating mechanism 501 at rest. Attachment site 512, cam arm 518, and attachment site 514 create a joint 530. Generally, actuating mechanism 501 operates as follows: the operator depresses the actuating lever 402 (shown in FIG. 2) and then the operator rotates actuating lever 402 which transmits a torque force (TF) through actuating arm 510 (not shown). The torque force (TF) is shown in FIG. 7B in the direction of the arrows. Such torque force (TF) rotates cam handle 503 which in turn rotates sites 512, 516A, and 516B (not shown). Thus, driver 505, and displacement shafts 506A and 506B (not shown) will be in motion at substantially the same time.

As cam handle 503 rotates, site 512 rotates in a downward direction forcing motion through cam arm 518 and, in turn, forcing driver 505 in a downward direction. Driver 505 passes through bore 320 such that second end 528 of the driver comes into contact with valve gate 304B. The downward motion of driver 505 pushes against valve gate 304B, which displaces valve gate 304B. The displacement of valve gate 304B forces resilient member 344B in a biased position. In a preferred embodiment, located substantially at the center of valve gate 304B is a groove 524. The shape of groove 524 corresponds with the geometric shape of the end face of driver 505 such that driver 505 engages groove 524.

At substantially the same time as site 512 is in motion, sites 516A and 516B are rotating in an upward direction, thus pulling displacement shafts 506A and 506B in an upward direction. This upward motion pulls at attachment sites 520A and 520B (not shown), which in turn pulls valve gate 304A upward, displacing valve gate 304A. The displacement of valve gate 304A forces resilient member 344A in a biased position. Thus, at substantially the same time, valve gates 304A and 304B are displaced or opened to establish fluid communication between the valve gates. FIG. 7B shows a side view of the actuating mechanism in full operation (i.e., fully opened) with valve gates 304A and 304B being displaced or opened. Thus, at least indirectly, actuating mechanism 501 acts to open both valve gates 304A and 304B at substantially the same time.

When actuating mechanism 501 is in fully open, with valve assembly 200 completely assembled, actuating mechanism 501 will lock into place automatically. This automatic locking feature is provided by the equilibrium of forces provided by the torque force (TF) and an equal and opposite retention force (RF) created by resilient member 344B. During actuation, cam arm 518 acts to shift attachment site 512 from attachment site 514, such that the sites are offset from one another as shown in FIG. 7B.

In other words, when actuating mechanism 501 is completely actuated, joint 530 is in an overextended position. When actuating mechanism 501 is fully actuated, resilient member 344B is depressed in a biased position. The retention force (RF) created by biased resilient member 344B acts upwardly through valve gate 304B to driver 505 to keep joint 530 locked in an overextended position. Once the retention force (RF) is applied, the torque force (TF) is no longer required and actuating mechanism 501 will remain locked until the retention force (RF) is removed. Thus, the present invention provides for an automatic locking mechanism when the actuating mechanism 501 is fully opened and dry break valve assembly 200 is fully assembled.

In a preferred embodiment, dry break valve assembly 200 has an automatic check valve feature (i.e., fail closed feature). When the sealing engagement between first housing portion 202 and second housing portion 204 is broken, valve assembly 200 automatically closes to prevent substantial leakage of fluid. As discussed above, valve gates 304A and 304B are maintained in the open position by applying a torque force (TF) and/or a retention force (RF). When actuating mechanism 501 is fully activated, and the torque force (TF) is removed, actuating mechanism 501 remains locked due to the retention force (RF) as discussed above. Releasing the retention force (RF) will cause actuating mechanism 501 to automatically close. Essentially, if no torque force (TF) or retention force (RF) is applied, actuating mechanism 501 is predisposed to spring back into its original position because resilient members 344A and 344B are biased in the closed position, i.e., valve gates 304A and 304B close at substantially the same time. Release of the retention force (RF) may occur when first housing portion 202 is separated from sealing engagement with second housing portion 204. It will be understood that separation of first housing portion 202 from second housing portion 204 may occur manually or automatically. Thus, the present invention provides for automatic checking of fluid flow whenever the valve assembly is disassembled, whether automatically or manually.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system including a fluid source and a fluid destination, a valve assembly disposed between the fluid source and the fluid destination for facilitating a transfer of fluid between the fluid source and the fluid destination such that leakage of the fluid is minimized when the valve assembly is disassembled, the valve assembly comprising:

a housing including a source housing and a destination housing, wherein a coupler releasably engages the source housing with the destination housing;

a source flow control assembly including a source resilient member disposed within the source housing, wherein the source flow control assembly controls the transfer of the fluid through the source housing;

a destination flow control assembly including a destination resilient member disposed within the destination housing, wherein the destination flow control assembly controls the transfer of the fluid through the destination housing;

an actuating lever operably connected with the housing;

an actuating mechanism operably connected with the actuating lever, wherein the actuating mechanism includes a driver and at least one displacement shaft, the at least one displacement shaft connected with the source flow control assembly, wherein the driver and the at least one displacement shaft cause the destination flow control assembly and the source flow control assembly to open at substantially the same time when the actuating lever is rotated, and wherein the source flow control assembly and the destination flow control assembly close when the source housing separates from the destination housing, said actuating mechanism configured to lock in an overextended position when fully actuated.

2. A valve assembly as defined in claim 1, wherein the source flow control assembly and the destination flow control assembly close at substantially the same time when the retention force is removed.

3. A valve assembly as defined in claim 1, wherein the coupler further comprises a collar mechanism and a breakable link assembly, wherein the collar mechanism releasably joins a first portion of the coupler with a second portion of the coupler.

4. A valve assembly as defined in claim 3, wherein the breakable link assembly connects a first end of the collar mechanism with a second end of the collar mechanism such that the collar mechanism is securely engaged with the coupler.

5. A valve assembly as defined in claim 4, wherein an application of a force exceeding a predetermined force causes the breakable link assembly to fail, wherein the collar mechanism is released from the coupler and wherein the source housing separates from the destination housing.

6. In a system including a fluid source and a fluid destination, a valve assembly disposed between the fluid source and the fluid destination for facilitating a transfer of fluid between the fluid source and the fluid destination such that leakage of the fluid is minimized when the valve assembly is disassembled, the valve assembly comprising:

a housing including a source housing and a destination housing, wherein a coupler releasably engages the source housing with the destination housing;

a source flow control assembly including a source resilient member disposed within the source housing, wherein the source flow control assembly controls the transfer of the fluid through the source housing, and wherein the source flow control assembly further comprises:

a valve gate having a tapered edge for engaging with a valve seat of a fitting member, wherein the valve gate has a bore for receiving a driver connected to the actuating mechanism and wherein the valve gate connects with the at least one displacement shaft;

a guide disposed within the source housing against a ridge of the source housing, the ridge providing structural support for the guide and the valve gate, wherein the source resilient member is disposed between the guide and the valve gate and exerts a force against the valve gate when the valve gate is in the open position; and a hollow shaft connecting the valve gate with the guide, wherein the hollow shaft is connected to the bore such that the driver slidably passes through the hollow shaft and the bore of the valve gate;

a destination flow control assembly including a destination resilient member disposed within the destination housing, wherein the destination flow control assembly controls the transfer of the fluid through the destination housing;

an actuating lever operably connected with the housing;

an actuating mechanism operably connected with the actuating lever, wherein the actuating mechanism includes a driver and at least one displacement shaft, the at least one displacement shaft connected with the source flow control assembly, wherein the driver and the at least one displacement shaft cause the destination flow control assembly and the source flow control assembly to open at substantially the same time when the actuating lever is rotated, and wherein the source flow control assembly and the destination flow control assembly close when the source housing separates from the destination housing.

7. The valve assembly as recited in claim 6, wherein the actuating mechanism is substantially disposed within a fluid flow passage cooperatively defined by the source housing and the destination housing when the source housing and destination housing are joined to each other.

8. In a system including a fluid source and a fluid destination, a valve assembly disposed between the fluid source and the fluid destination for facilitating a transfer of fluid between the fluid source and the fluid destination such that leakage of the fluid is minimized when the valve assembly is disassembled, the valve assembly comprising:

a housing including a source housing and a destination housing, wherein a coupler releasably engages the source housing with the destination housing;

a source flow control assembly including a source resilient member disposed within the source housing, wherein the source flow control assembly controls the transfer of the fluid through the source housing;

a destination flow control assembly including a destination resilient member disposed within the destination housing, wherein the destination flow control assembly controls the transfer of the fluid through the destination housing, and wherein the destination flow control assembly further comprises a valve gate having a tapered edge for engaging with a valve seat of a sealing member, the sealing member included in the destination housing, wherein the valve gate includes:

a guide disposed within the destination housing against a ridge of the destination housing, the ridge providing support for the guide and the valve gate, wherein the destination resilient member is disposed between the guide and the valve gate and exerts a retraction force against the valve gate when the valve gate is in the open position such that the actuating mechanism is locked in the open position by the retraction force; and a solid member connecting the guide and the valve gate, wherein the destination resilient member is disposed along the solid member;

an actuating lever operably connected with the housing; and an actuating mechanism operably connected with the actuating lever, wherein the actuating mechanism includes a driver and at least one displacement shaft, the at least one displacement shaft connected with the source flow control assembly, wherein the driver and the at least one displacement shaft cause the destination flow control assembly and the source flow control assembly to open at substantially the same time when the actuating lever is rotated, and wherein the source flow control assembly and the destination flow control assembly close when the source housing separates from the destination housing;

means for automatically locking said actuating mechanism in an overextended position upon full engagement of said actuating mechanism.

9. The valve assembly as recited in claim 8, wherein the actuating mechanism is substantially disposed within a fluid flow passage cooperatively defined by the source housing and the destination housing when the source housing and destination housing are joined to each other.

10. A valve assembly for use in managing flow between a fluid source and a fluid destination, the valve assembly comprising:

a source housing having a source flow control assembly substantially disposed within the source housing;

a destination housing having a destination flow control assembly substantially disposed within the destination housing;

means for releasably joining the source housing and the destination housing; and means for activating an actuating mechanism, wherein the activating of the actuating mechanism at least indirectly causes the actuating mechanism to displace at substantially the same time the source flow control assembly and the destination flow control assembly in an open position, establishing fluid communication between the fluid source and the fluid destination; and means for automatically locking said actuating mechanism in an overextended position upon full engagement of said actuating mechanism.

11. A valve assembly as defined in claim 10, wherein the destination flow control assembly exerts a retention force on the actuating mechanism when the source flow control assembly and the destination flow control assembly are displaced in the open position, the retention force causing the actuating mechanism to automatically lock in the open position.

12. A valve assembly as defined in claim 11, wherein the source flow control assembly and the destination flow control assembly automatically close at substantially the same time when the retention force is removed.

13. A valve assembly as defined in claim 10, further comprising means for automatically separating the source housing and the destination housing.

14. A valve assembly as defined in claim 13, wherein the automatic separation of the source housing and the destination housing occurs at substantially the same time as the closing of the source flow control assembly and the destination flow control assembly.

15. A valve assembly as defined in claim 13, wherein said means for activating said actuating mechanism comprises an actuating lever operably connected to said actuating mechanism.

16. A valve assembly as defined in claims 10, wherein said means for releasably joining the source housing and the destination housing comprises a coupler.

17. A valve assembly as defined in claim 16, wherein the coupler further comprises a collar having a breakable link assembly which maintains the collar securely engaged about the coupler so as to assist the coupler in releasably joining the source housing and the destination housing.

18. A valve assembly as defined in claim 17, wherein the breakable link assembly is configured to support a predetermined force, whereupon application of a force that exceeds the predetermined force causes the breakable link assembly to fail, wherein the collar is released from secure engagement from the coupler when the breakable link assembly fails and the source housing separates from the destination housing.

19. A valve assembly for use in managing flow between a fluid source and a fluid destination, the valve assembly comprising:
 a source housing having a source flow control assembly substantially disposed within the source housing, and the source flow control assembly comprising:
  a valve gate having a tapered edge for engaging with a valve seat of a fitting member such that the source housing does not leak when the valve gate sits in the valve seat, wherein the valve gate has a bore for receiving a driver connected to the actuating mechanism;
  a guide disposed within the source housing against a ridge of the source housing, the ridge providing structural support for the guide and the valve gate, wherein the source resilient member is disposed between the guide and the valve gate and exerts a force against the valve gate when the valve gate is in the open position; and
  a hollow shaft connecting the valve gate with the guide, wherein the hollow shaft is connected to the bore such that the driver slidably passes through the hollow shaft and the bore of the valve gate;
 a destination housing having a destination flow control assembly substantially disposed within the destination housing;
 means for releasably joining the source housing and the destination housing; and
 means for activating an actuating mechanism, wherein the activating of the actuating mechanism at least indirectly causes the actuating mechanism to displace at substantially the same time the source flow control assembly and the destination flow control assembly in an open position, establishing fluid communication between the fluid source and the fluid destination.

20. The valve assembly as recited in claim 19, wherein the actuating mechanism is substantially disposed within a fluid flow passage cooperatively defined by the source housing and the destination housing when the source housing and destination housing are joined to each other.

21. A valve assembly for use in managing flow between a fluid source and a fluid destination, the valve assembly comprising:
 a source housing having a source flow control assembly substantially disposed within the source housing;
 a destination housing having a destination flow control assembly substantially disposed within the destination housing, the destination flow control assembly comprising:
  a valve gate having a tapered edge for engaging with a valve seat of a sealing member such that the destination housing does not leak when the valve gate sits in the valve seat, the sealing member included in the destination housing;
  a guide disposed within the destination housing against a ridge of the destination housing, the ridge providing support for the guide and the valve gate;
  a destination resilient member disposed between the guide and the valve gate wherein the destination resilient member exerts a retraction force against the valve gate when the valve gate is in the open position such that the actuating mechanism is locked in the open position by the retraction force; and
  a solid member connecting the guide and the valve gate, wherein the destination resilient member is disposed along the solid member;
 means for releasably joining the source housing and the destination housing; and
 means for activating an actuating mechanism, wherein the activating of the actuating mechanism at least indirectly causes the actuating mechanism to displace at substantially the same time the source flow control assembly and the destination flow control assembly in an open position, establishing fluid communication between the fluid source and the fluid destination; and
 means for automatically locking said actuating mechanism in an overextended position upon full engagement of said actuating mechanism.

22. The valve assembly as recited in claim 21, wherein the actuating mechanism is substantially disposed within a fluid flow passage cooperatively defined by the source housing and the destination housing when the source housing and destination housing are joined to each other.

23. In a fluid transfer system including a fluid source and a fluid destination, a valve assembly being disposed between the fluid source and fluid destination, the valve assembly comprising:
 a housing including a source housing and a destination housing, wherein a source flow control assembly is substantially disposed within the source housing and wherein a destination flow control is substantially disposed within the destination housing;
 a coupler having a first portion and a second portion, wherein the coupler releasably joins the source housing and the destination housing;
 a collar connecting the first portion with the second portion; and
 an actuating mechanism disposed within the housing for automatically checking fluid flow between the source housing and the destination housing, said actuating mechanism configured to automatically lock in an overextended position when fully opened.

24. A valve assembly as defined in claim 23, wherein the collar further comprises a breakable link assembly connecting a first end of the collar with a second end of the collar such that the first portion and the second portion of the coupler are partially contained within the collar such that the first portion and the second portion are securely connected by the collar.

25. A valve assembly as defined in claim 24 wherein said breakable link assembly is configured to support a predetermined force, wherein application of force that exceeds the predetermined force causes the breakable link assembly to fail, wherein the collar is released from secure engagement from the coupler such that the source housing is no longer connected with the destination housing, and wherein the source flow control assembly and the destination flow control assembly close the source housing and the destination housing such that the fluid does not leak.

26. A valve assembly as defined in claim 23, wherein the actuating mechanism is operably configured to displace the source flow control assembly and the destination flow control assembly in an open position at substantially the same time, establishing fluid communication between the fluid source and fluid destination.

27. A valve assembly as defined in claim 23, wherein the destination flow control assembly exerts a retention force on the actuating mechanism when the source flow control assembly and the destination flow control assembly are displaced in the open position, the retention force causing the actuating mechanism to automatically lock in the open position.

28. A valve assembly as defined in claim 23, wherein the source flow control assembly and the destination flow control assembly automatically close at substantially the same time when the retention force is removed.

29. A valve assembly for use in managing fluid flow between a fluid source and a fluid destination, the valve assembly comprising:
   an actuating lever;
   an actuating mechanism operably connected to said actuating lever;
   a source housing having a source flow control member substantially disposed within the source housing, wherein the source flow control member is operably connected to the actuating mechanism; a destination housing having a destination flow control member substantially disposed within the destination housing, wherein the destination flow control member is disposed in operative relation to the actuating mechanism; and
   a coupler disposed between the source housing and the destination housing for releasably joining the source housing and the destination housing, the coupler further comprising a collar engaged about the coupler, wherein the collar includes a breakable link assembly which maintains the collar securely engaged about the coupler;
   wherein a force applied to the actuating lever at least indirectly causes the actuating mechanism to displace the source flow control member and the destination flow control member in an open position at substantially the same time, so as to facilitate establishment of fluid communication between the fluid source and the fluid destination, and wherein the destination flow control member exerts a retention force on the actuating mechanism when the source flow control member and the destination flow control member are displaced in the open position, the retention force causing the actuating mechanism to automatically lock in an overextended open position, and wherein the source flow control member and the destination flow control member automatically close at substantially the same time when the retention force is removed,
   wherein the breakable link assembly is configured to support a predetermined force, wherein application of force that exceeds the predetermined force causes the breakable link assembly to fail, wherein the collar is released from secure engagement from the coupler such that source housing is automatically separated from the destination housing; and
   wherein the separation of the source housing and the destination housing occurs at substantially the same time as the closing of the source flow control member and the destination flow control member.

30. A valve assembly suitable for use in facilitating fluid flow management, the valve assembly comprising:
   first and second housing portions configured to be releasably joined together, the first and second housing portions collectively defining at least one fluid flow passage when joined together;
   first and second flow control assemblies disposed within the first and second housing portions, respectively, said first and second flow control assemblies each further comprising a valve gate biased into a predetermined position by a corresponding resilient member;
   an actuating mechanism operably connected with the first and second flow control assemblies and substantially disposed in the at least one fluid flow passage; means for automatically locking said actuating mechanism in an overextended position upon full engagement of said actuating mechanism; and
   an actuating lever operably connected with the actuating mechanism.

31. The valve assembly as recited in claim 30, wherein the actuating mechanism comprises a cam mechanism.

32. The valve assembly as recited in claim 30, wherein the actuating mechanism is substantially disposed within the first housing portion.

33. The valve assembly as recited in claim 30, further comprising a coupling configured to releasably join the first and second housing portions together.

34. The valve assembly as recited in claim 33, wherein the coupling comprises at least one sacrificial element configured to fail in response to exertion of a predetermined force on at least one of the first and second housings.

35. The valve assembly as recited in claim 33, further comprising a compensating washer arranged so as to be interposed between the coupling and the first housing portion when the first housing portion is received within the coupling.

36. A valve assembly suitable for use in facilitating fluid flow management, the valve assembly comprising:
   first and second housing portions configured to be releasably joined together, the first and second housing portions collectively defining at least one fluid flow passage when joined together;
   first and second flow control assemblies disposed within the first and second housing portions, respectively;
   an actuating mechanism operably connected with the first and second flow control assemblies and substantially disposed in the at least one fluid flow passage; means for automatically locking said actuating mechanism in an overextended position upon full engagement of said actuating mechanism: and
   an actuating lever operably connected with the actuating mechanisms, wherein the first and second flow control assemblies are each biased into a predetermined position when the first and second housing portions are not joined together by the coupling.

37. A valve assembly suitable for use in facilitating fluid flow management, the valve assembly comprising:
   first and second housing portions configured to be releasably joined together, the first and second housing portions collectively defining at least one fluid flow passage when joined together;
   first and second flow control assemblies disposed within the first and second housing portions, respectively;
   an actuating mechanism operably connected with the first and second flow control assemblies and substantially disposed in the at least one fluid flow passage; means for automatically locking said actuating mechanism in an overextended position upon full engagement of said actuating mechanism; and
   an actuating lever operably connected with the actuating mechanisms, wherein the first and second flow control assemblies are configured and arranged for substantially simultaneous motion in opposite directions.

38. A valve assembly suitable for use in managing fluid flow, the valve assembly comprising:
- first and second housing portions configured to be releasably joined together by a coupling, the first and second housing portions collectively defining at least one fluid flow passage when joined together;
- first and second flow control assemblies disposed within the first and second housing portions, respectively;
- an actuating mechanism configured to automatically lock in an overextended position substantially disposed in the at least one fluid flow passage, and the actuating mechanism comprising:
  - a cam mechanism;
  - at least one displacement shaft connected to the cam mechanism, the at least one displacement shaft being operably connected with the first flow control assembly;
  - a driver connected to the cam mechanism, the driver being arranged for operational contact with the second flow control assembly; and
  - an actuating lever operably connected with the cam mechanism.

39. The valve assembly as recited in claim 38, wherein the at least one displacement shaft comprises two displacement shafts.

40. The valve assembly as recited in claim 38, wherein the at least one displacement shaft and the driver are configured and arranged for substantially simultaneous motion in opposite directions.

41. The valve assembly as recited in claim 38, wherein each of the first and second flow control assemblies comprises a valve gate, the valve gate of the first flow control assembly being operably connected with the at least one displacement shaft, and the valve gate of the second flow control assembly being operably connected with the driver.

42. The valve assembly as recited in claim 41, further comprising first and second resilient members, the first resilient member being configured and arranged to bias the valve gate of the first flow control assembly in a first predetermined direction, and the second resilient member being configured and arranged to bias the valve gate of the second flow control assembly in a second predetermined direction.

43. The valve assembly as recited in claim 42, wherein the first and second predetermined directions are the opposite of each other.

44. The valve assembly as recited in claim 38, wherein the first flow control assembly further comprises a fitting member, and the second flow control assembly further comprises a sealing member configured to substantially receive the fitting member when the first and second housing portions are joined to each other.

45. The valve assembly as recited in claim 44, wherein the fitting member comprises a substantially annular ridge and the sealing member comprises a substantially annular channel.

46. The valve assembly as recited in claim 38, wherein the collar comprises at least one sacrificial element configured to fail in response to exertion of a predetermined force on at least one of the first and second housings.

47. The valve assembly as recited in claim 38, wherein the first and second flow control assemblies are each biased into a closed position at least when the first and second housing portions are not joined together by the coupling.

48. The valve assembly as recited in claim 38, wherein the driver passes through a bore defined by the first flow control assembly.

49. A valve assembly suitable for use in managing fluid flow, the valve assembly comprising:
- first and second housing portions configured to be releasably joined together by a coupling, the first and second housing portions collectively defining at least one fluid flow passage when joined together;
- first and second flow control assemblies disposed within the first and second housing portions, respectively;
- an actuating mechanism configured to automatically lock in an overextended position and operably connected with the first and second flow control assemblies and substantially disposed in the at least one fluid flow passage; and
- an actuating lever operably connected with the actuating mechanism, wherein the actuating mechanism causes the first and second flow control assemblies to automatically assume a closed position upon removal of the coupling.

50. The valve assembly as recited in claim 49, wherein the actuating mechanism converts a torque input by way of the actuating lever into motion of the first and second flow control assemblies.

51. The valve assembly as recited in claim 49, wherein the actuating mechanism causes the first and second flow control assemblies to move toward each other when assuming a closed position, and away from each other when assuming an open position.

52. The valve assembly as recited in claim 49, wherein the actuating mechanism causes the first and second flow control assemblies to open at substantially the same time.

53. The valve assembly as recited in claim 49, wherein the actuating mechanism causes the first and second flow control assemblies to close at substantially the same time.

54. A valve assembly suitable for use in managing fluid flow, the valve assembly comprising:
- first and second housing portions configured to be releasably joined together by a coupling, the first and second housing portions collectively defining at least one fluid flow passage when joined together;
- first and second flow control assemblies disposed within the first and second housing portions, respectively;
- an actuating mechanism configured to automatically lock in an overextended position and operably connected with the first and second flow control assemblies and substantially disposed in the at least one fluid flow passage; and
- an actuating lever operably connected with the actuating mechanism, wherein at least one of the first and second flow control assemblies exerts a retention force on the actuating mechanism when the first and second flow control assemblies are in an open position.

55. The valve assembly as recited in claim 54, wherein the retention force facilitates maintenance of the first and second flow control assemblies in the open position.

* * * * *

UNITED STATES PATENT AND TRADEMARK OFFICE
CERTIFICATE OF CORRECTION

PATENT NO.    : 6,672,327 B1
DATED         : January 6, 2004
INVENTOR(S)   : Lee A. Krywitsky It is certified that error appears in the above-identified patent and that said Letters Patent is hereby corrected as shown below:

Column 18,
Line 52, insert -- a -- after "of".

Column 19,
Line 50, insert -- a -- after "of".
Line 54, insert -- the -- after "that".

Column 20,
Line 43, change ":" to -- ; --.
Line 65, change "mechanisms" to -- mechanism --.

Signed and Sealed this

Eighteenth Day of October, 2005

JON W. DUDAS
*Director of the United States Patent and Trademark Office*